Figure 1:
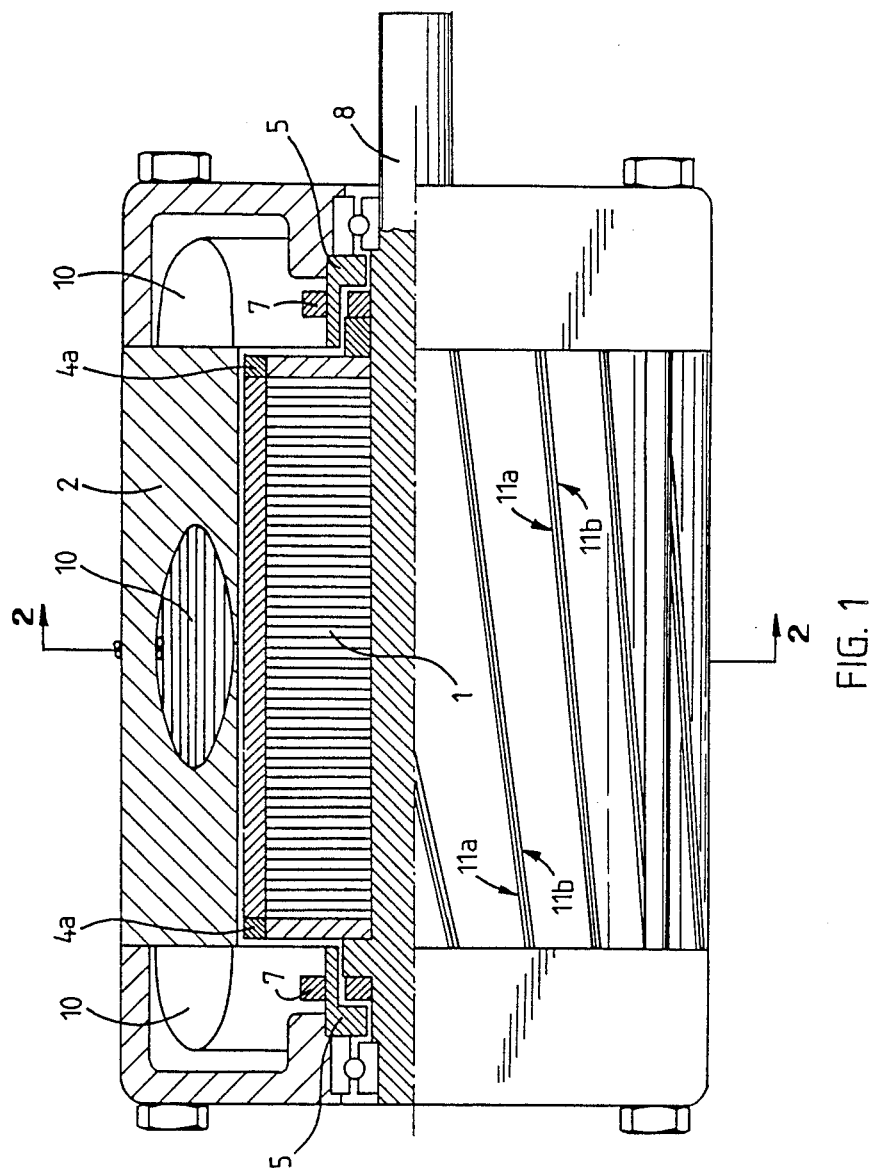

United States Patent [19]

Poro

[11] Patent Number: 4,980,594
[45] Date of Patent: Dec. 25, 1990

[54] COMPACT SERVOMATOR HAVING AN INTEGRALLY WOUND RESOLVER

[75] Inventor: Antti Poro, Hämeenlinna, Finland
[73] Assignee: Innoke Oy, Hameenlinna, Finland
[21] Appl. No.: 382,681
[22] PCT Filed: Feb. 18, 1988
[86] PCT No.: PCT/FI88/00025
    § 371 Date: Aug. 16, 1989
    § 102(e) Date: Aug. 16, 1989
[87] PCT Pub. No.: WO88/06376
    PCT Pub. Date: Aug. 25, 1988

[30] Foreign Application Priority Data
Feb. 19, 1987 [FI] Finland .................. 870691

[51] Int. Cl.⁵ .................. H02K 29/12
[52] U.S. Cl. .................. 310/168; 310/112; 310/171; 310/185; 310/254; 318/605
[58] Field of Search .............. 318/138, 254, 605, 660, 318/661; 310/162, 165, 168, 171, 184, 185, 198, 254, 261, 112, 113

[56] References Cited

U.S. PATENT DOCUMENTS

| | | | |
|---|---|---|---|
| 3,483,457 | 12/1969 | Fertig et al. | 318/138 |
| 3,705,343 | 12/1972 | Ringland et al. | 318/661 X |
| 4,255,682 | 3/1981 | Toida et al. | 310/185 X |
| 4,310,790 | 1/1982 | Mulet-Marquis | 318/661 X |
| 4,398,110 | 8/1983 | Flinchbaugh et al. | 310/83 |
| 4,458,168 | 7/1984 | Welburn | 310/185 |
| 4,568,865 | 2/1986 | Welburn | 310/185 X |
| 4,577,127 | 3/1986 | Ferree et al. | 310/83 |
| 4,659,953 | 4/1987 | Luneau | 310/111 |
| 4,772,815 | 9/1988 | Harned et al. | 318/661 X |

FOREIGN PATENT DOCUMENTS

| | | |
|---|---|---|
| 0174290 | 3/1986 | European Pat. Off. |
| 3022934 | 12/1981 | Fed. Rep. of Germany |
| 1209411 | 10/1970 | United Kingdom |
| 1382670 | 2/1975 | United Kingdom |

*Primary Examiner*—Bentsu Ro
*Attorney, Agent, or Firm*—Lyon & Lyon

[57] ABSTRACT

The invention relates to an electric motor comprising a rotor (1), a stator (2) and at least two pole pairs. One particularly preferred application of the electric motor according to the invention is small-size accurate servomotors of high capacity. At present the feed back information required by servomotors is generally obtained from at least partially separate transduced means attached to the servomotor, such as an optical or magnetic coder, a tachogenerator or resolver. A drawback of these known solutions is mainly that the volume and weight of the motors is high. This problem is eliminated in the motor according to the invention by providing it with an integral resolver so that primary windings (4a, 4b) of the resolver is arranged in the rotor (1) of the motor, and that secondary windings (11a, 11b) of the resolver are wound round the stator (2) of the motor in such a manner that the winding wire goes alternately inside and outside the stator.

13 Claims, 4 Drawing Sheets

COMPACT SERVOMATOR HAVING AN INTEGRALLY WOUND RESOLVER

The invention relates to an electric motor comprising a rotor, a stator and at least two pole pairs. One particularly preferred application of the electric motor according to the invention is small-size accurate servomotors of high capacity.

At present, feed-back information required by servomotors is generally obtained from at least partially separate transducing means attached to the motors, such as an optical or magnetic coder, a tachogenerator, or resolver. A drawback of these known solutions is that the volume and weight of the motors is high. In addition, the adjusting system is subject to disturbances, which is due to the clearances and flexibility of the coupling.

The object of the present invention is thus to eliminate the drawbacks described above. According to the invention it has been found that a resolver can be integrated into the basic structure of the motor if the number of pole pairs in the motor is at least double as compared with that of the resolver. With this kind of motor, the above-described drawbacks of the prior art are eliminated by providing the motor with an integral resolver in which the primary winding of the resolver is arranged in the rotor of the motor and that the secondary winding of the resolver is wound around the stator of the motor in such a manner that the winding wire extends alternately inside and outside the stator.

As is known, the absolute angle position, velocity, and direction of the rotor can thus be determined on the basis of signals generated in the, secondary winding of the resolver. These signals can be used for further controlling the commutation, velocity, and positioning of the motor.

According to the invention it is possible, if desired, to integrate a synchro or some other transducing means of the type with a rotating transformer in the basic structure of the motor. Amongst these, however, the resolver is the most useful alternative in view of the control of the servomotor, for instance, wherefore it is used in this particular case. As used herein, the term "resolver", however, has to be considered to have a wider meaning in such a way as described above.

A motor effected according to the invention is clearly smaller and lighter than known motors comprising a separate resolver for obtaining feed-back information. Consequently, the present invention is particularly suited for uses in which a small size and lightness are among the basic requirements set for the motor. Such uses include e.g. aeroplanes. In addition, the structure according to the invention eliminates the liability to disturbances caused by the flexibility and clearances. One more major advantage of the present invention is that a motor constructed in accordance there with is cheaper than comparable motor of the prior art.

Figure 2:
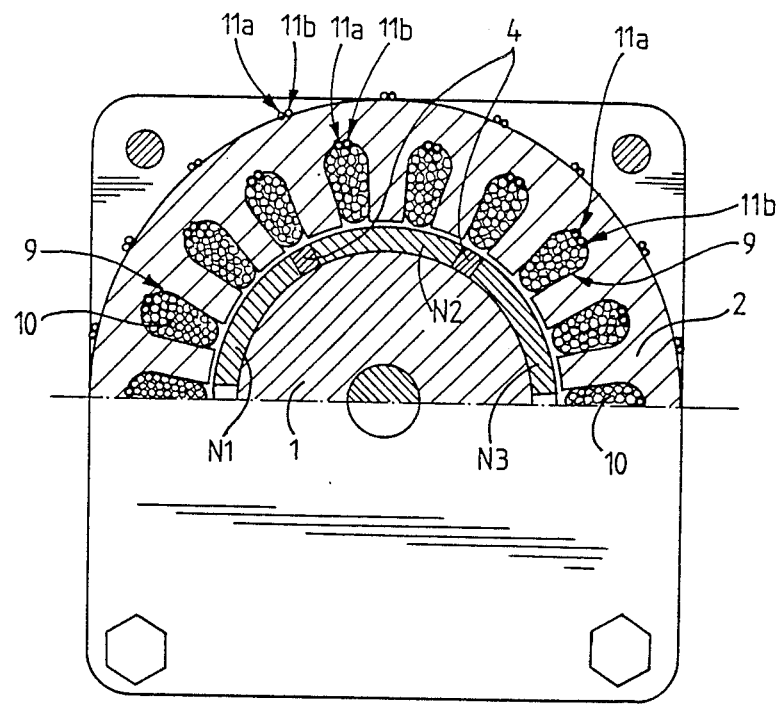
Figure 3A:
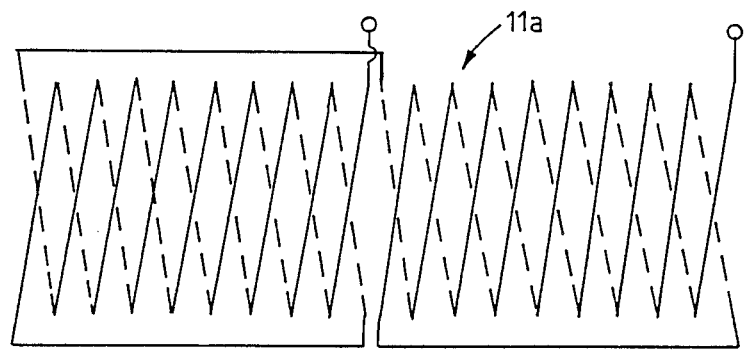
Figure 3B:
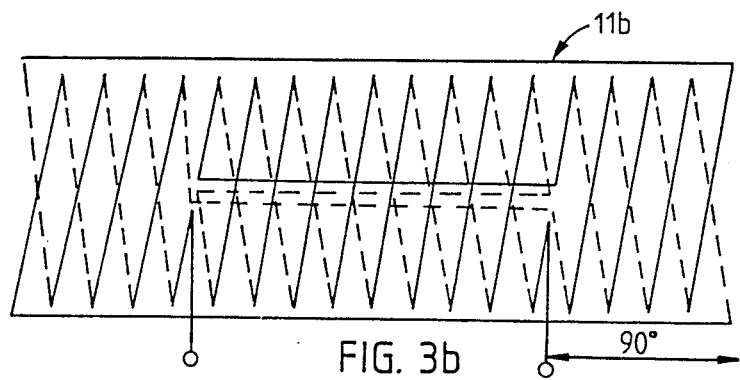
Figure 3C:
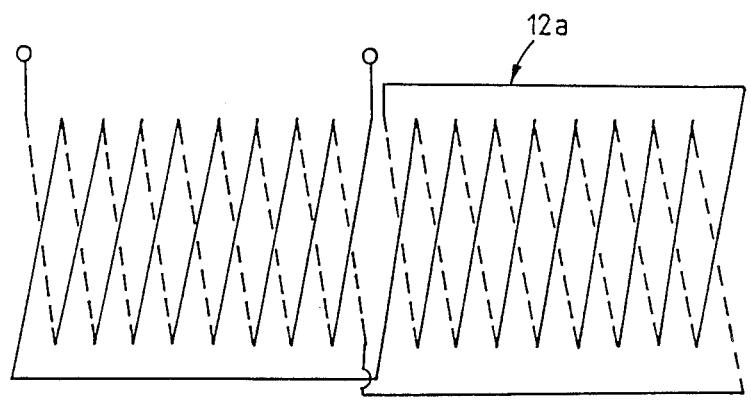
Figure 3D:
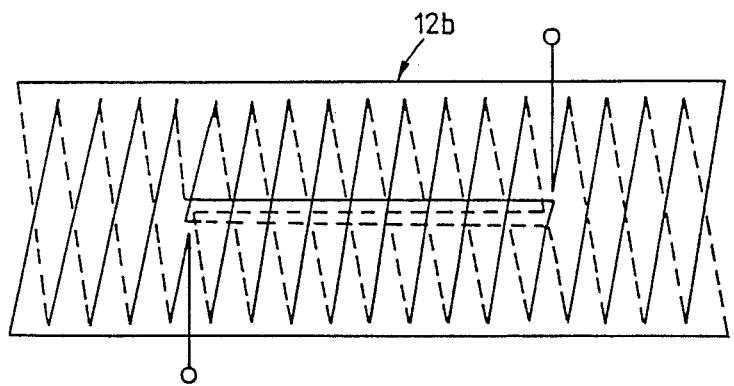
Figure 4:
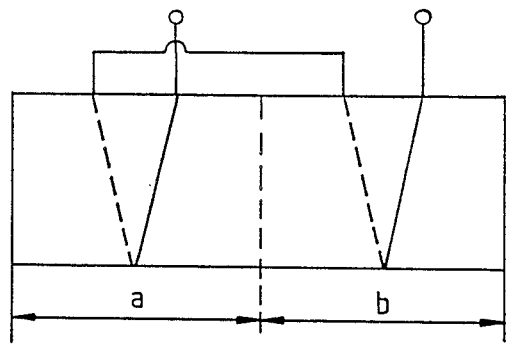
Figure 5:
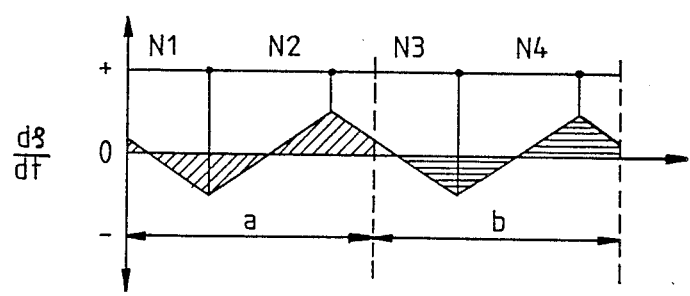
Figure 6:
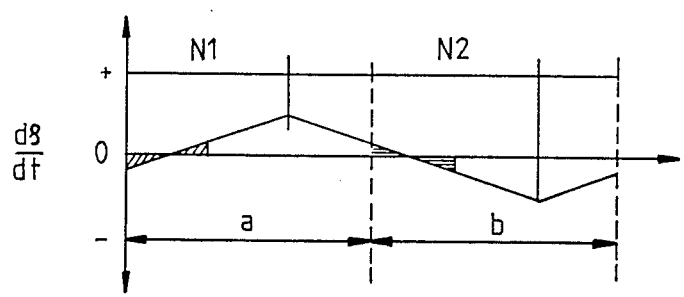

In the following the invention and its preferred embodiments will be described in more detail with reference to the examples of the attached drawings, wherein FIG. 1 is a partial longitudinal cross-section of a brushless permanent magnet motor in which the number of pole pairs in the resolver is one, FIG. 2 is a cross-sectional view of the motor of FIG. 1 in the direction of the line A—A, FIGS. 3a and 3b illustrate one way of winding the secondary windings of the resolver in the motor shown in FIGS. 1 and 2, FIGS. 3c and 3d illustrate an alternative way of winding for the way of shown in FIGS. 3a and 3b, FIG. 4 is a simplified view of the secondary winding of the resolver as a planar view for the demonstration of noise voltage, FIG. 5 illustrates a noise voltage occurring in the secondary winding of the resolver in the case of a quadripole motor, and FIG. 6 illustrates a noise voltage occurring in the secondary winding of the resolver in the case of a bipolar motor.

FIGS. 1 and 2 illustrate a hexapolar brushless permanent magnet motor, the rotor and stator of which are indicated with the reference numerals 1 and 2, respectively. The rotor periphery is formed by six magnetic poles N1 to N6, of which the three upper poles N1 to N3 are visible in the sectional view of FIG. 2. The primary or rotor winding of the resolver is formed by two windings 4a and 4b which, in the specific motor shown in the figures, are wound around pole magnets disposed at an angle of 180 degrees with respect to each other. Thus, only the upper winding 4a is visible in FIGS. 1 and 2; however, for the sake of clarity, the lower winding 4b (not shown) is positioned at an angle of 180 degrees with respect to the winding 4a. The alternating reference voltage of the resolver is applied to the windings 4a and 4b by means of an inductive coupling. In this particular motor, this takes place simultaneously by means of inductive switches (windings) 5 positioned at both ends of the rotor. From these inductive switches, the reference voltage is induced in windings 7 positioned at the ends of the rotor; the windings 7, in turn, are connected in series with the two rotor windings 4a and 4b of the resolver. In this particular motor the inductive coupling is designed so that it utilizes a shaft 8 of the motor as a part of the magnetic circuit. Thereby the shaft has to be of special construction. Within the area of the rotor, it has to be ferromagnetic and magnetically soft, within the area of the shaft ends preferably non-ferromagnetic. Of course, other solutions for obtaining an inductive coupling are also possible, as well as other ways of applying a reference voltage to the rotor windings 4a and 4b of the resolver, e.g. slip-rings. The inductive coupling operates without brushes, as is desireable in all parts of a brushless motor.

A stator winding 10 is arranged in winding slots 9 formed in the stator 2 in a manner known per se. The secondary or stator winding of the resolver is wound around the stator 2, which secondary winding is formed by two windings, 11a and 11b, positioned at an angle of 90 degrees with respect to each other. In the cross-section of FIG. 2, the winding wires are visible in pairs in which one wire belongs to the winding 11a and the other to the winding 11b. The winding wire in the windings passes alternately along the stator 2 and in the winding slot 9. FIG. 1 shows two wire pairs the secondary winding of the resolver in the upper half of the motor in a cross-section so as to show that they extend in an oblique manner.

FIGS. 3a and 3b illustrate in more detail the way of winding the secondary windings 11a and 11b of the resolver in this particular tooth-type motor in which the winding slots 9 are bevelled in the longitudinal direction over one spacing. FIG. 3a illustrates the winding 11a, and FIG. 3b the winding 11b. Both windings are shown in a planar view; the winding has been cut in the middle, and the halves are coupled in such a manner that one half in the coupling is the reverse of the other. The winding wire portion positioned in the winding slot 9 is indicated with a broken line and the winding wire portion positioned on the periphery of stator 2 with a continuous line. As appears from FIG. 3a the winding wire of the winding 11a first passes through 180 degrees in every other winding slot 9, returns thereafter to the starting point and goes in every other winding slot 9, whereafter it goes over to go round the other half of 180 degrees in a similar way. The winding wire of the winding 11a shown in FIG. 3b goes in the corresponding way, however, with a displacement of 90 degrees with respect to the winding 11a. When the winding is carried out as described above, the winding is distributed evenly in this specific dc motor in which the winding slots are bevelled over one spacing. In principle, a single winding turn of one winding of 180 degrees shown in FIGS. 3a and 3b is enough for obtaining a resolver signal, the rest only amplify the signal.

FIG. 3c shows an alternative way of winding from that shown in FIG. 3a. In this case, the winding wire first goes around through 180 in every other winding slot 9, then goes over to the other half of 180 degrees, around which it goes twice in every other winding slot 9, whereafter it goes back to the first half of 180 degrees and goes around it in every other winding slot 9. A corresponding alternative for the way of winding of FIG. 3b is shown in FIG. 3d. The winding wire of a winding 12b shown in FIG. 3d goes similarly as the winding wire of the winding 12a in FIG. 3c but with a displacement of 90 degrees with respect to it. As to the windings shown in FIGS. 3a to 3d, it should be noted that their starting point may be positioned arbitrarily along the periphery of the stator whereby the way of presentation may change correspondingly. It is further to be noted that, irrespective of the way of winding, the winding wires may be wound several times, that is, a single winding wire may be replaced with a skein comprising several wires.

In the following, possible noise voltages and the requirements they set to the motor will be dealt with. A noise voltage may occur in the secondary winding 11a, 11b or 12a, 12b of the resolver due to (i) the rotation of the permanent magnetic field within the stator 2, and (ii) alternating magnetic fields caused by stator currents. Their effect on the secondary winding of the resolver can be illustrated by an imaginary planar view of the secondary winding of the resolver shown in FIG. 4 and by simplifying the winding to one typical winding in each winding half (a and b) which are connected in series as shown in FIG. 4. As known, the electromotoric force E induced in the winding can be calculated by the formula $$E = -Nd\phi/dt$$

wherein N is the number of winding turns and $\phi$ is magnetic flux. When the winding turns are positioned evenly round the stator, the area of the graph of change of the magnetic field illustrates the induced total voltage within ranges a and b. When the winding halves are coupled as described above, a condition for a value zero of the pole voltage is that the total change of the field within the range a reduced with the total change of the field within the range b is equal to zero. A special case of this condition is that the total change of the field within both the range a and the range b is equal to zero.

Case (i) will be discussed first, that is, the noise voltage induced in the secondary winding of the resolver by the permanent magnet field rotating within the stator. It is assumed that the field caused by the poles is sinusoidal, whereby the change of the field, too, is sinusoidal, though 90 degrees out of phase therewith. Accordingly, the value of change $(d\phi/dt)$ of the field has, alternatively, the minimum and the maximum value at shift points between the poles, at which points the value $(\phi)$ of the field has zero at which points the value $(\phi)$ of the field has zero crossings. FIG. 5 shows a situation in which a quadripolar permanent magnet field rotates within the stator 2 at a given moment. The curve thus illustrates the value of change $d\phi/dt$ of the field; for the sake of simplicity, the curve is not shown in the sinusoidal form; instead, it is formed by rectilinear parts because the shape of the field does not affect the final result in this case. However, the fields have to be equal in shape at each pole (N1, N2 . . . ). The horizontal axis in FIG. 5 represents the length of the periphery of the stator, and the section of each pole is indicated with the respective reference N1 to N4. As appears from the figure, the areas of the graphs of change compensate each other separately both within the range a and the range b, whereby the induced pole voltage is zero. This will happen when the number of poles is even and at least four.

In case (ii), the magnetic fields caused by stator currents are analogous with the above-described permanent magnetic fields, and so are the changes thereof. As compared to case (i), the only difference is the phase shift of 90 degrees when the motor operates ideally. Accordingly, the magnetic fields caused by the stator currents do not cause an additional voltage in the secondary winding of the resolver when the number of the poles is even and at least four.

FIG. 6 further illustrates a situation corresponding to that of FIG. 5 when a bipolar magnetic field alternates within the stator 2. As appears from the figure, the area of the graph of change has a determined total value (unshadowed area) both within the range a and the range b, depending on the position of the poles with respect to said ranges a and b. Consequently, a voltage is induced in the secondary winding of the resolver. Correspondingly, it appears from the figure that a voltage is induced in the secondary windings of the resolver if a magnetic field having an even number of poles alternates within the stator. An absolute prerequisite for the motor according to the invention is that it comprises an even number of poles which are at least four.

Similarly as described above, it is also possible to prove that when the magnetic fields and the graphs of change thereof are asymmetrical in shape, no additional voltage occurs in the secondary windings of the resolver if the number of poles in the field is at least two. A prerequisite is that all the fields are similarly asymmetrical.

The combined effect of the reference current and the rotatory movement of the rotor 1 also causes a noise signal proportional to the speed of rotation of the rotor in the secondary windings 11a and 11b or 12a and 12b of the resolver. This is undesirable because the amplitude of the resolver signal should not be dependent on the speed of rotation. However, it can be proved that this noise signal is fairly insignificant, and its effects can be compensated for in known manners, if this is considered necessary.

Disturbances may occur for the following reasons:

A. The permanent magnetic poles (N1, N2 . . . ) have unequal flux values with respect to each other, which causes an imbalance therebetween. Unequal flux values may be due to e.g. a slightly different magnetization of the magnets.

B. The mounting of the rotor is eccentric and the size of the air gap may vary due to manufacturing tolerances.

C. The secondary winding of the resolver is not distributed quite evenly round the stator.

However, the above sources of disturbance can be minimized in a suitable way if they distort the output signals of the secondary windings of the resolver too much. This minimizing can be carried out e.g. by magnetic balancing of the rotor and electronic compensation of the disturbances.

A noise voltage may possibly also occur when the winding currents and magnetic fields act on the inductive coupling of the reference voltage of the resolver, which coupling is indicated with the reference numerals 5 and 7 in FIG. 1. The effect of the currents of the stator winding 10, however, can be compensated for by applying a reference voltage simultaneously to both ends of the rotor, as shown in FIG. 1. The directions of the currents should thereby be chosen so that the stator current amplifies the reference voltage at one end and weakens it at the other end. The shape and dimensions of the stator winding should be equal at both ends.

In principle, it is also possible that a noise voltage is induced in the primary windings 4a and 4b of the resolver if an external magnetic field moves with respect to them. Fields caused by permanent magnets do not, however, induce a voltage in the primary windings of the resolver because their position with respect to the primary windings is fixed. On the other hand, it can be proved that the total voltage induced by the stator windings 10 in the primary windings 4a and 4b of the resolver is zero if the windings 4a and 4b are connected in series.

To sum up the above discussion on noise voltages, it is obvious that the magnetic fields of the motor do not, in principle, affect the resolver signals. However, disturbances caused by manufacturing inaccuracies may occur, but these can be eliminated by careful planning. In addition to that, an insignificant additional signal proportional to the speed of rotation of the rotor is formed similarly as in other resolvers.

The above discussion refers to a resolver integrated in the basic structure of the motor and having one pole pair. A resolver having a higher number of pole pairs than this is obtained in the following way: it is imagined that a combination of a one-pole-pair resolver and a motor is split at one side thereof; the stator and the rotor are spread into a sector having an angle of 360° divided with a desired number of pole pairs in the resolver and this is attached to other sectors obtained in the same way. Couplings between these windings are carried out according to the same principles as what is disclosed above concerning the couplings of a resolver comprising one pole pair. It follows from the above that an absolute prerequisite for integrating a resolver comprising several pole pairs in the basic structure of the motor is that the number of pole pairs in the motor has to be at least double with respect to the number of pole pairs in the resolver.

The motor according to the invention can be applied particularly to small-size accurate servomotors of high capacity, because the volume and weight of the feedback transducing means of such motors form a substantial part of the entire motor. As to the different types of motor, the following may be stated. In principle, this particular structure is suitable both for synchronous and asynchronous motors irrespective of whether they comprise a tooth-type or toothless stator. The rotor may be of a cylinder, ring or disc type; cylinder and ring type rotors, however, are perhaps the most practical in this respect.

One application is a stepping motor type salient pole motor if it is constructed so that at least four poles are magnetized concurrently and identically except that successive fields must have different directions.

Even though the invention has been described above with reference to the examples of the attached figures, the invention is not restricted thereto, but one skilled in the art can, of course, modify it within the inventive idea defined in the attached claims and his own professional skill.

I claim:

1. An electric motor comprising a rotor (1), a stator (2) and at least two pole pairs, and having an integral resolver, said integral resolver including a primary winding (4a, 4b) arranged in the rotor (1) of the motor, and a secondary winding (11a, 11b; 12a, 12b) wound around the stator (2) of the motor in such a manner that the wires forming said secondary winding pass alternately inside and outside the stator.

2. The organization of claim 1 wherein said electric motor is of the permanent magnet motor type and in which the primary winding (4a, 4b) of the resolver is disposed between magnet poles (N1, N2 . . . ) positioned along the rotor periphery.

3. The organization of claim 1 wherein said electric motor is an induction motor in which the primary winding (4a, 4b) of the resolver is arranged on the periphery of the rotor (1).

4. The organization according to claim 2 or 3, in which the primary winding of the resolver is formed by two windings (4a, 4b) arranged at an angle of 180 degrees with respect to each other and connected together in series.

5. The organization according to claim 4, in which said stator includes winding slots circumferentially spaced about the interior thereof and the secondary winding (11a, 11b; 12a, 12b) of the resolver is arranged so that the winding wire extends alternately between a winding slot (9) of the stator (2) and the exterior thereof.

6. The organization according to claim 5, in which the winding wire of the secondary winding (11a, 11b; 12a, 12b) of the resolver is wound around the stator through 180 degrees, extending through every other winding slot (9).

7. The organization according to claim 5, in which the winding wire of the secondary winding (11a, 11b; 12a, 12b) is wound around the same 180 degrees two times, whereby the winding slots (9) of the first and second winding turns are different slots.

8. The organization according to claim 5, in which the secondary winding (11a, 11b; 12a, 12b) in the resolver is formed by two halves going through 180 degrees around the entire stator (2).

9. The organization according to claim 1 in which said stator includes winding slots circumferentially spaced about the interior thereof and the secondary winding (11a, 11b; 12a, 12b) of the resolver is arranged so that the winding wire extends alternately between a winding slot (9) of the stator (2) and the exterior thereof.

10. The organization according to claim 9, in which the winding wire of the secondary winding (11a, 11b; 12a, 12b) of the resolver is wound around the stator through 180 degrees, extending through every other winding slot (9).

11. The organization according to claim 10, in which the winding wire of the secondary winding (11a, 11b; 12a, 12b) is wound around the same 180 degrees two times, whereby the winding slots (9) of the first and second winding turns are different slots.

12. The organization according to claim 10, in which the secondary winding (11a, 11b; 12a, 12b) in the resolver is formed by two halves going through 180 degrees around the entire stator (2).

13. The organization according to claim 1, in which the number of pole pairs in said motor is at least double that in said resolver.

* * * * *